Aug. 3, 1965    C. N. FANGMAN ETAL    3,198,295
FRICTION COUPLE COOLING DEVICE
Filed Feb. 21, 1963    3 Sheets-Sheet 3

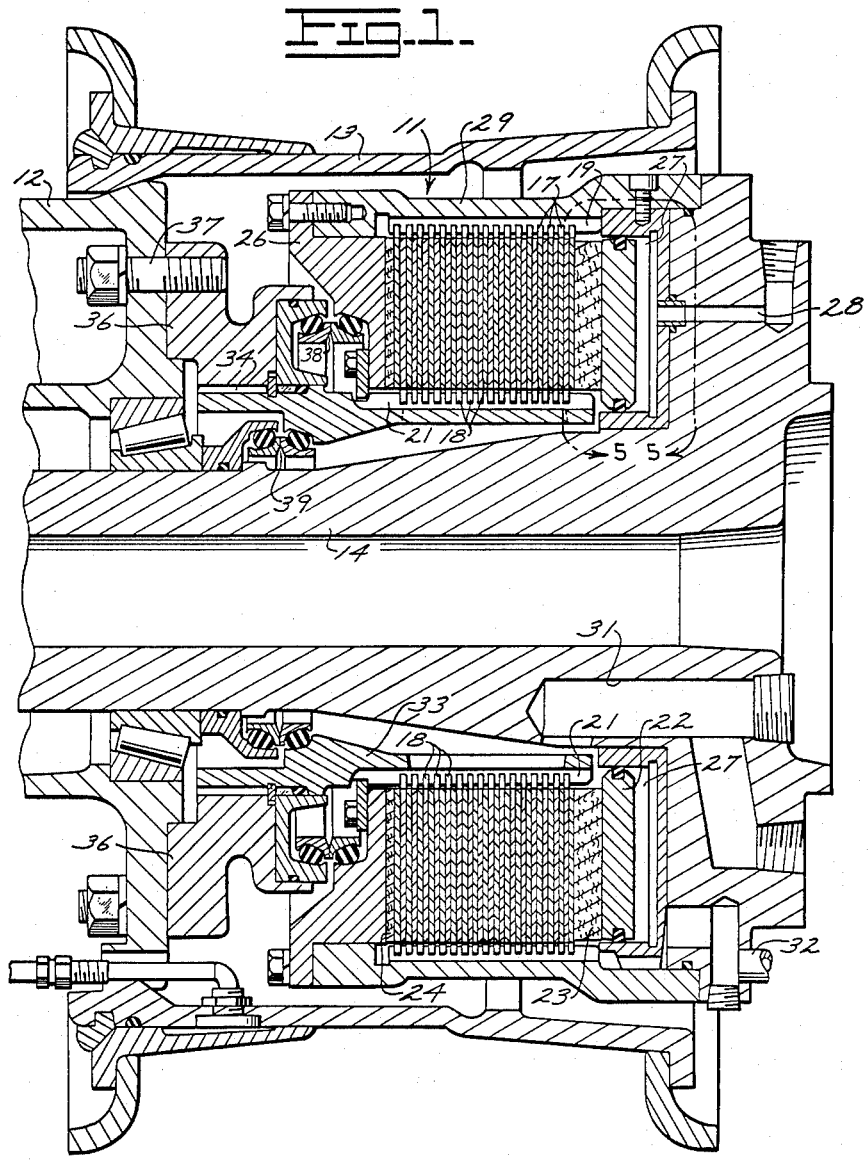

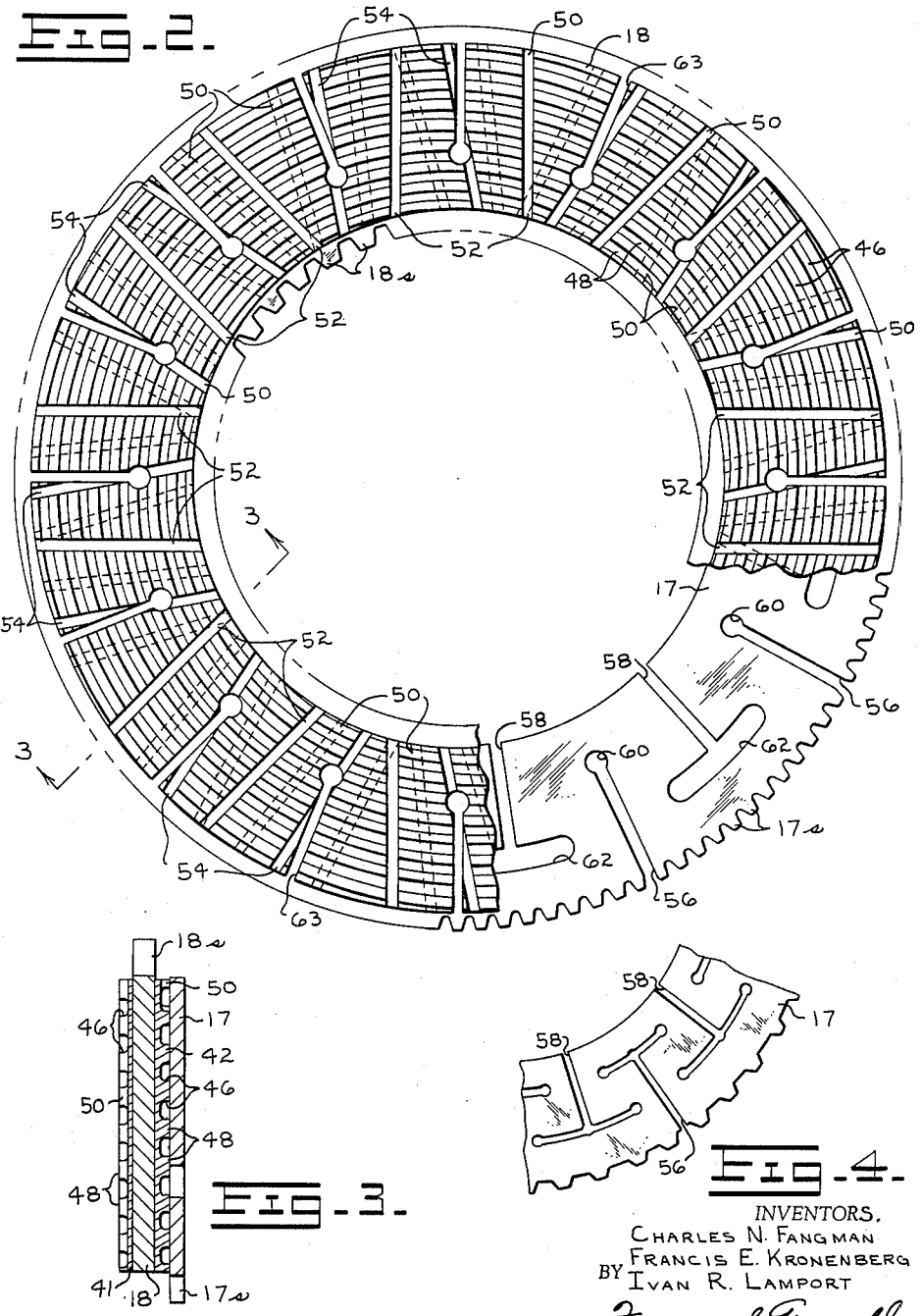

INVENTORS.
CHARLES N. FANGMAN
BY FRANCIS E. KRONENBERG
IVAN R. LAMPORT

ATTORNEYS 3,198,295
FRICTION COUPLE COOLING DEVICE
Charles N. Fangman and Francis E. Kronenberg, Peoria, and Ivan R. Lamport, East Peoria, Ill., assignors to Caterpillar Tractor Co., Peoria, Ill., a corporation of California
Filed Feb. 21, 1963, Ser. No. 260,178
2 Claims. (Cl. 188—264)

The present invention relates to friction couples of the kind in which torque is transmitted between two relatively rotatable members by an interleaved stack of friction discs and particularly to such friction couples as used for a wheel brake for large wheeled vehicles.

The high speed, load carrying application of earthmoving vehicles requires retarding devices to limit the speed of the vehicle when operating on long down grades for safety to the operator and equipment. Although it is common practice to provide a retarding device in the vehicle drive line, separate from the normal service brake, it is recognized that this adds considerably to the initial and maintenance cost of the machine as well as unnecessarily complicating the structure of the vehicle drive line. In view of this problem, it is desirable that a wheel brake have sufficient capacity to serve both as a vehicle retarding device and service brake. Since the function of brake mechanisms is based on frictional contact between members carried on relatively rotatable parts, it has heretofore been impractical to use the brakes as a vehicle retarder for extended periods of time due to the excessive amount of heat generated by contact of the relatively rotatable parts. A considerable amount of work has been done on the development of various means for dissipating heat from brakes of this kind, but basic problems, often resulting in failure of the brake elements, have remained present in commercial designs. Thus, while the circulation of cooling oil through the brake discs controls somewhat the maximum temperature obtained in the brake for a given period of engagement, a relatively high temperature level is still present which can result in malfunction and premature failure of improperly designed brakes. It is a primary object of the present invention to construct a wheel brake having sufficient capacity to serve both as a vehicle retarding device and service brake.

One of the problems encountered in disc brakes of this general type is that of excessive variations in thermal expansion in different sectors of the discs. Excessive variations in thermal expansion can cause yielding and permanent buckling of the discs from the desired flat configuration. For example, the temperature level adjacent the outer periphery of the discs will be somewhat higher than that adjacent the inner periphery due to the differential in surface speed at the inner and outer edges of the discs. Unless the discs are properly designed, the radially outer portion of the discs will expand an amount greater than the radially inner portions of the discs and result in yielding of material near the center of the discs. This causes each of the discs to "dish" or assume a conical state when the temperature level is reduced and the discs attempt to return to their original dimensions and flat configuration.

In order to provide sufficient torque capacity for stopping large earthmoving vehicles, without requiring excessive pressure in the actuating chambers of the brake, sintered metallic facings, having a high coefficient of friction, are bonded to opposite faces of metal disc. It is a specific object of the present invention to distribute the sintered metallic facings across substantially the entire radial extent of the disc to minimize variations in temperature across the radial extent of the disc. It is a corollary object to provide flow paths in adequate number and in proper orientation and position to reduce variations in thermal expansion to a level where the variations in thermal expansion which do occur can readily be accommodated by a simple slotting arrangement in the discs.

Any tendency of the brake actuating piston to cock or misalign in its cylinder can cause scoring and galling of the piston and cylinder and result in binding of the piston. Misalignment not only causes unequal pressures on the discs but also prevents proper release to the brakes. This creates further heat and distortion and contributes to early failure of the discs. In the present invention, the actuator piston is formed with a spherically curved outer periphery and the edges of the inner periphery are chamfered. The piston is suspended in a desired radial position by compressed, resilient seals at the inner and outer peripheries with the clearance between the piston and the associated walls of its cylinder maintained substantially greater at the inner periphery than at the outer periphery of the piston. This combination of features prevents piloting of the piston at its inner diameter and insures that whatever piston and cylinder wall contact does occur, during any excessive cocking of the piston, will occur on the spherical bearing surface at the outer periphery of the piston. A piston incorporating these features and effective to function in the manner described constitutes a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view in section of a brake constructed in accordance with one embodiment of the present invention;

FIG. 2 is an elevation view, with parts broken away, of the rotor and stator friction discs of the brake shown in FIG. 1;

FIG. 3 is a view in section through the disc taken along the line and in the direction indicated by the arrows 3—3 in FIG. 2;

FIG. 4 is a fragmentary view of an alternate form of stator disc;

Figure 5:
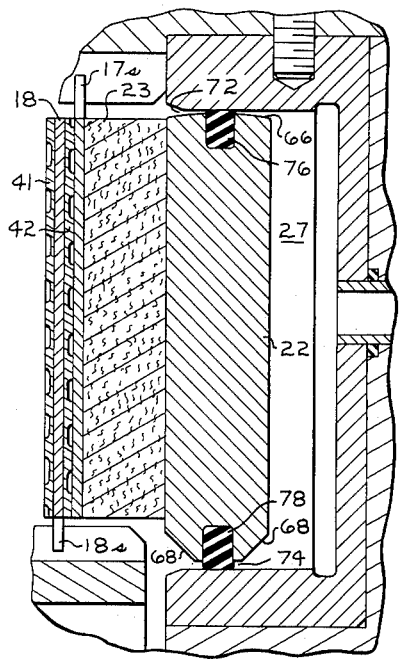
FIG. 5 is a fragmentary enlarged view of the portion of the brake shown encircled by the arrows 5—5 in FIG. 1 showing details of construction of the actuating piston.

In FIG. 1, a brake constructed in accordance with one embodiment of the present invention is indicated generally by the reference number 11. In general construction and mode of operation, brake 11 is similar to that disclosed in recently issued U.S. Patent No. 3,072,220 and pending application Serial No. 248,607, now Patent No. 3,136,389, both assigned to the same assignee as the present invention.

The brake 11, as shown, is disposed between a rotatable wheel 12 and wheel rim 13 and a nonrotatable axle housing 14.

The brake 11 comprises a stack of interleaved friction discs having faces movable into frictional contact and associated alternately throughout the stack with the rotatable wheel 12 and nonrotatable axle housing 14. Thus, discs 17 are nonrotatable and are associated with the stationary axle housing 14, and discs 18 are rotatable with the wheel 12. The discs 17 and 18 are free to move axially along respective splines 19 and 21 and into frictional engagement with one another. An annular actuator piston 22, acting through a ring 23 of resilient material against a similar ring 24 of resilient material on a back place 26, supplies the axial force for compressing the stack into torque transmitting, frictional engagement. Piston 22 is in turn actuated by fluid pressure admitted to a chamber 27 by passageways 28. Piston 22 and end plate 26 define the side walls and the axle housing 14 and an outer wall 29 provide the other walls for a fluid chamber surrounding the stack of discs. Cooling oil is circulated through the chamber thus defined from an inlet 31 to an outlet 32.

In the form of the invention illustrated in FIG. 1, the splines 21 are provided on the outer diameter of a coupling member 33 used to connect the discs 18 for rotation with the wheel 12. The coupling member 33 includes a second set of splines 34 which are outside the chamber and which engage with complementary splines on a wheel member 36 attached to the wheel 12 by studs 37. The coupling member 33, wheel member 36 and wheel 12 could be formed as one integral part if desired without affecting the braking function of the brake 11 of the present invention.

Seals 38 and 39 are provided between the chamber wall 26 and the axle housing to prevent loss of cooling fluid from the brake chamber.

As best shown in FIGS. 2 and 3, each of the discs 18 comprises an annular metal plate formed with integral splines 18S at the inner periphery of the plate. Sintered metallic facings 41 and 42 are bonded to opposed faces of the plate 18 and extend across substantially the entire radial extent of the plate from the splines to the outer periphery. Since the entire friction face of the disc 18 is thus covered by the friction facings, frictional heat is distributed across the entire disc and abrupt temperature variations are avoided.

Multiple lead spiral grooves 46 are formed in each of the facings 41 and 42 to provide circumferential paths for flow of cooling oil through the disc stack. As best shown in FIG. 3, the spacing between the grooves may preferably be made substantially equal to the width of the grooves so that the lands 48, which contact an adjacent stator disc 17, are of equal width with the grooves 46. This permits a large number of flow paths consistent with a large area of frictional surface contact. The use of spiral grooves rather than concentric grooves permits the grooves to be machined in the friction facings by moving a multiple tooth tool across the facings at the depth desired to provide the spiral grooves in a single operation.

A large quantity of oil must be passed through the disc stack to dissipate the heat generated by frictional sliding contact of the discs 17 and friction facings 41 and 42. For this reason, a plurality of radial grooves 50 are provided in the facings 41 and 42 to permit relatively unrestricted flow of cooling oil between the discs. These radial grooves 50 intersect the spiral grooves 46 to further break up the continuous area of lands 48 and to permit more complete heat extraction from the land area when the brake is engaged. Thus, the side walls and bottoms of the spiral grooves 46 and radial grooves 50 present a large area of the facing material to the cooling oil for improved dissipation of heat from all portions of the facing material.

As best shown in FIG. 2, the grooves 50 are provided in parallel pairs as indicated at 52 and 54 with each pair 52 being disposed at an angle of 45° with respect to the adjacent pair 52 to provide half of the grooves 50. The pairs of grooves 54 are disposed in the same manner with respect to each other and the two sets of pairs 52 and 54 are circumferentially offset sufficient to position one groove of each pair in one set substantially midway between a parallel pair of grooves in the other set. Arranging the radial grooves in this manner enables pairs of diametrically opposed grooves to be formed in a friction facing by single pass with a pair of mill cutters. As illustrated in FIG. 2, each radial groove 50 in the friction facing 41 is disposed substantially midway between a pair of radial grooves 50 in the friction facing 42. Circumferentially offsetting the radial grooves 50 in the facings 41 and 42 in this manner further reduces the unbroken area of lands 48 not having a substantial flow of oil adjacent thereto. Thus, heat generated near the center of the lands 48 between the grooves 50 in facing 41 is dissipated by oil flowing through an adjacent radial groove 50 in friction facing 42.

The flow of cooling oil is radially outwardly through the disc pack and is enhanced by a pumping action of the radial grooves 50 and spiral grooves 46 and centrifugal force due to rotation of the disc 18.

The disc 17 is made from high strength steel and includes integral splines 17S at its inner periphery. Due to the configuration of the disc 17, this disc would normally be subject to warping and distortion due to excessive heat and variations in the temperature gradient in the disc. For this reason, disc 17 is provided with a plurality of alternate radially inwardly and outwardly extending slots 56 and 58 respectively. The radially inwardly extending slots 56 terminate in a slightly enlarged circular opening 60 to eliminate sharp corners which could possibly cause fatigue cracks due to thermal expansion and contraction of the disc. The outwardly extending slots 58 terminate in circumferentially extending slots 62 to form a T-slot configuration. Each of these radial slots extend beyond the radial center line of the disc. These slots allows radial and circumferential expansion and contraction of the disc 17 without attendant warping, dishing or distortion.

FIG. 4 discloses an alternate form of stator disc 17 in which the radially inwardly extending slots 56 also terminate in circumferential extending slots. This form of slotting provides greater thermal capacity for the disc but requires a stronger material or wider circumferential slot spacing to provide a torque capacity equal to that of the disc 17 shown in FIG. 2.

Radial slots 63 similar to and substantially the same length of slots 56 in disc 17 are provided in the outer periphery of the disc 18 to permit expansion of the outer portion of these discs due to higher temperature near their outer periphery.

Figure 6:
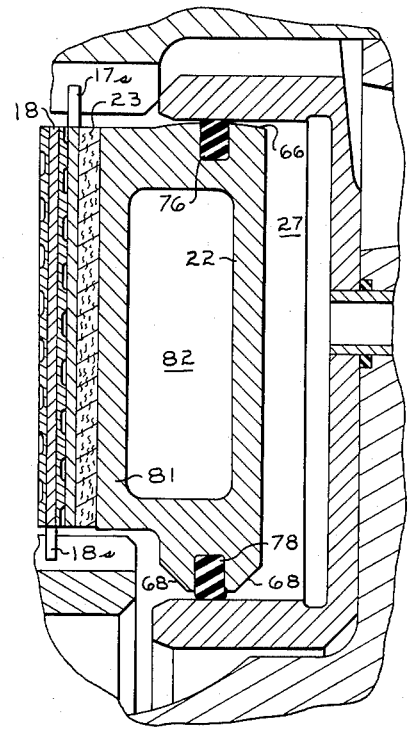
FIG. 6 is a fragmentary view similar to FIG. 5 but disclosing an alternate form of actuator piston.

With reference now to FIGS. 5 and 6, the actuator piston 22 is formed with a spherically curved outer periphery 66. The edges of the inner periphery are chamfered at 68 so that the inner periphery is substantially narrower than the outer periphery of the piston. Resilient seal members 76 and 78 are mounted within grooves formed at the outer and inner peripheries and are under sufficient compression to suspend the piston 22 in the radial position illustrated. The outer and inner clearances 72 and 74 are small enough that the compression of the resilient tori 76 and 78 maintains the piston 22 in position between the related walls of its cylinder without the use of backup washers. The inner clearance 74 is substantially greater than the outer clearance 72. As a result of these factors, gouging of the corners of the inner periphery of the piston against the walls of the piston cylinder is prevented and any piston-cylinder contact that does occur, in the event of excessive cocking of the piston 22, occurs on the spherical bearing surface 66. This allows the piston to move freely, to the right as viewed in FIG. 5, under the influence of the cooling oil pressure as pressure in the chamber 27 is vented to release the brake. This eliminates drag between the relatively rotating discs 17 and 18 to minimize heat generation when the brake is disengaged.

In some instances, the relatively thick section of ring 22 may permit undesirable variations in thickness and compressed density effecting the pressure exerted on the brake discs 17 at any given point. In FIG. 6, there is illustrated a piston construction which permits a relatively thin resilient pad 23 to be utilized. As illustrated in FIG. 6, the piston 22 includes an axially extending boss 81 which permits a substantial reduction in the thickness of the resilient ring 23. The piston 22 is formed with a hollow chamber 82 to reduce the weight of the piston.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the followings claims.

We claim:

1. A rotary friction disc for a fluid cooled friction couple of the kind which cooling fluid is circulated through a stack of engaged, relatively rotatable friction discs to prevent overheating of the discs, said disc comprising an annular metal plate formed with splines about one periphery, a sintered metallic friction facing bonded to each face of the plate and extending across substantially the entire radial extent of the plate from the splines to the other periphery for minimizing differences in thermal expansion between the inner and outer portions of the plate, each of said facings having generally circumferential grooves formed therein across the entire radial extent of the facing, said circumferential grooves being multiple lead spiral grooves, each of said facings also having generally radially extending grooves formed therein at substantially equal intervals about the circumference of the facing with each radial groove in one facing disposed between two radial grooves in the other facing, the radial grooves being formed as a first and second set of parallel pairs, each pair in each set being disposed at 45° with respect to an adjacent pair in the set, and the two sets being circumferentially offset sufficient to position one groove of each pair in the second set substantially midway between a parallel pair of grooves in the first set, and radial slots extending inwardly from the outer periphery through both the facings and the metal plate and terminating in a slightly enlarged circular opening disposed in the inner annular portion of the friction disc to accommodate circumferential expansion of the outer peripheral portion of the friction disc.

2. In a fluid cooled disc brake for a wheeled vehicle of the kind in which cooling fluid is circulated through a stack of engaged, relatively rotatable friction discs to prevent overheating of the discs, a plurality of rotatable friction discs each comprising an annular metal plate formed with splines at the inner periphery, a sintered metallic friction facing bonded to each face of each rotatable plate and extending across substantially the entire radial extent of the plate from the splines to the outer periphery for minimizing differences in thermal expansion between the inner and outer portions of the plate, each of said facings having generally circumferential grooves formed therein across the entire radial extent of the facing and providing lands of substantially equal width with the grooves, the circumferential grooves being multiple lead spiral grooves, each of said facings also having generally radially extending grooves formed therein at substantially equal intervals about the circumference of the facing with each radial groove in one facing disposed substantially midway between two radial grooves in the other facing, the radial grooves being formed as a first and second set of parallel pairs, each pair in each set being disposed at 45° with respect to an adjacent pair in the set, and the two sets being circumferentially offset sufficient to position one groove of each pair in the second set substantially midway between a parallel pair of grooves in the first set, and radial slots extending inwardly from the outer periphery through both the facings and the metal plate and terminating in a slightly enlarged circular opening disposed in the inner annular portion of the friction disc to accommodate circumferential expansion of the outer peripheral portion of the friction disc, and nonrotatable friction discs interleaved with the rotatable discs, each nonrotatable disc comprising a metal plate formed with a first set of radial slots extending inwardly from the outer periphery and terminating in a slightly enlarged circular opening and a second set of radial slots disposed midway between the first slots and extending outwardly from the inner periphery and terminating in a circumferential slot.

References Cited by the Examiner

UNITED STATES PATENTS

| 2,428,452 | 10/47 | Farmer | 92—107 |
| 2,728,421 | 12/55 | Butler | 188—218 |
| 2,835,355 | 5/58 | Armstrong | 188—218 |
| 2,850,118 | 9/58 | Byers | 188—218 |
| 3,022,770 | 2/62 | Sanders et al. | 92—107 |
| 3,061,048 | 10/62 | Alsobrooks et al. | 188—18 |
| 3,063,531 | 11/62 | Aschauer | 188—264.22 X |
| 3,071,210 | 1/63 | Wrigley et al. | 188—18 |
| 3,081,842 | 3/63 | Zindler et al. | 188—72 |
| 3,094,194 | 6/63 | Kershner | 188—73 |

FOREIGN PATENTS 66,357    2/48    Denmark.

ARTHUR L. LA POINT, *Primary Examiner.*

EUGENE G. BOTZ, *Examiner.*